April 27, 1965

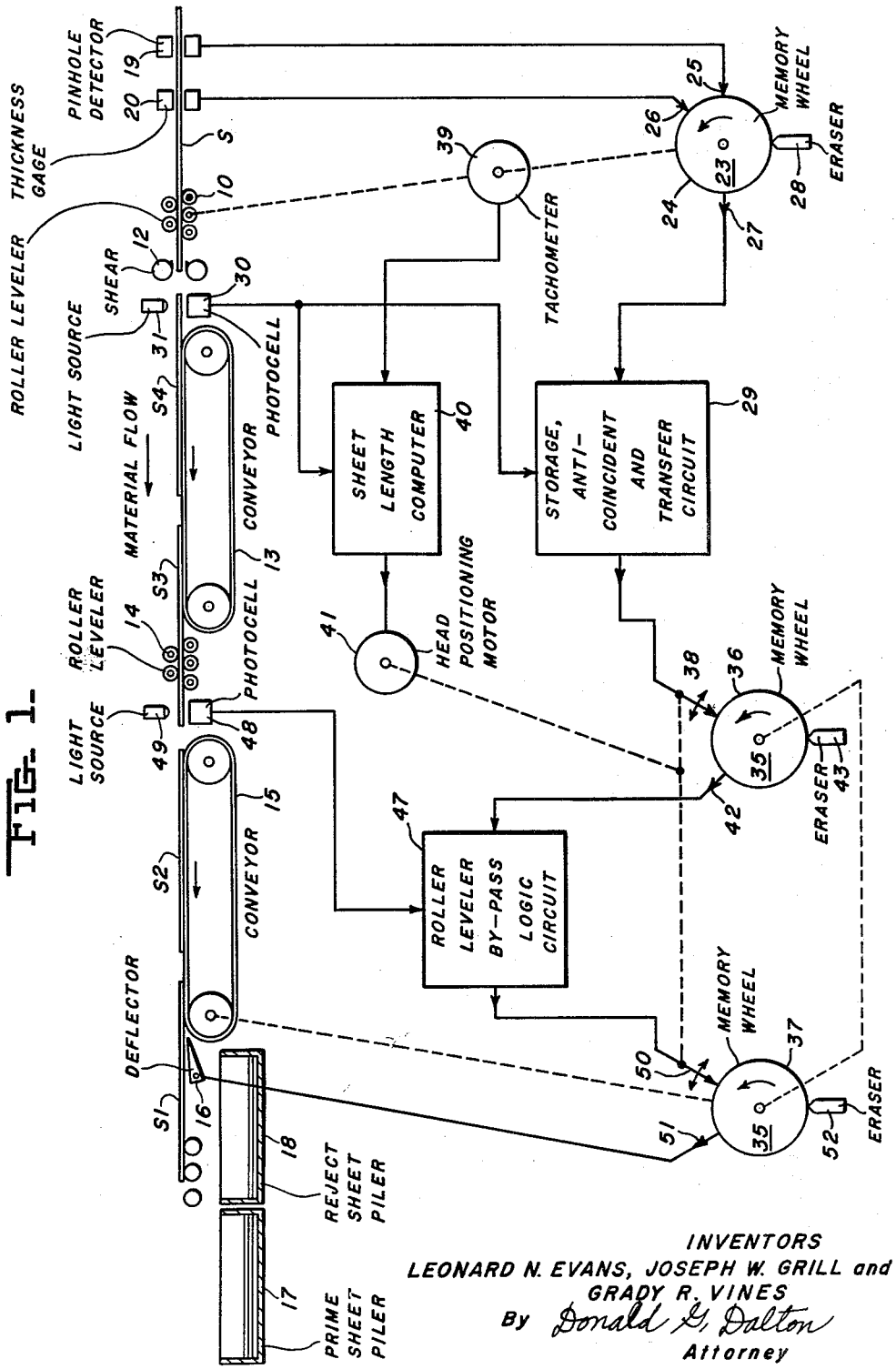

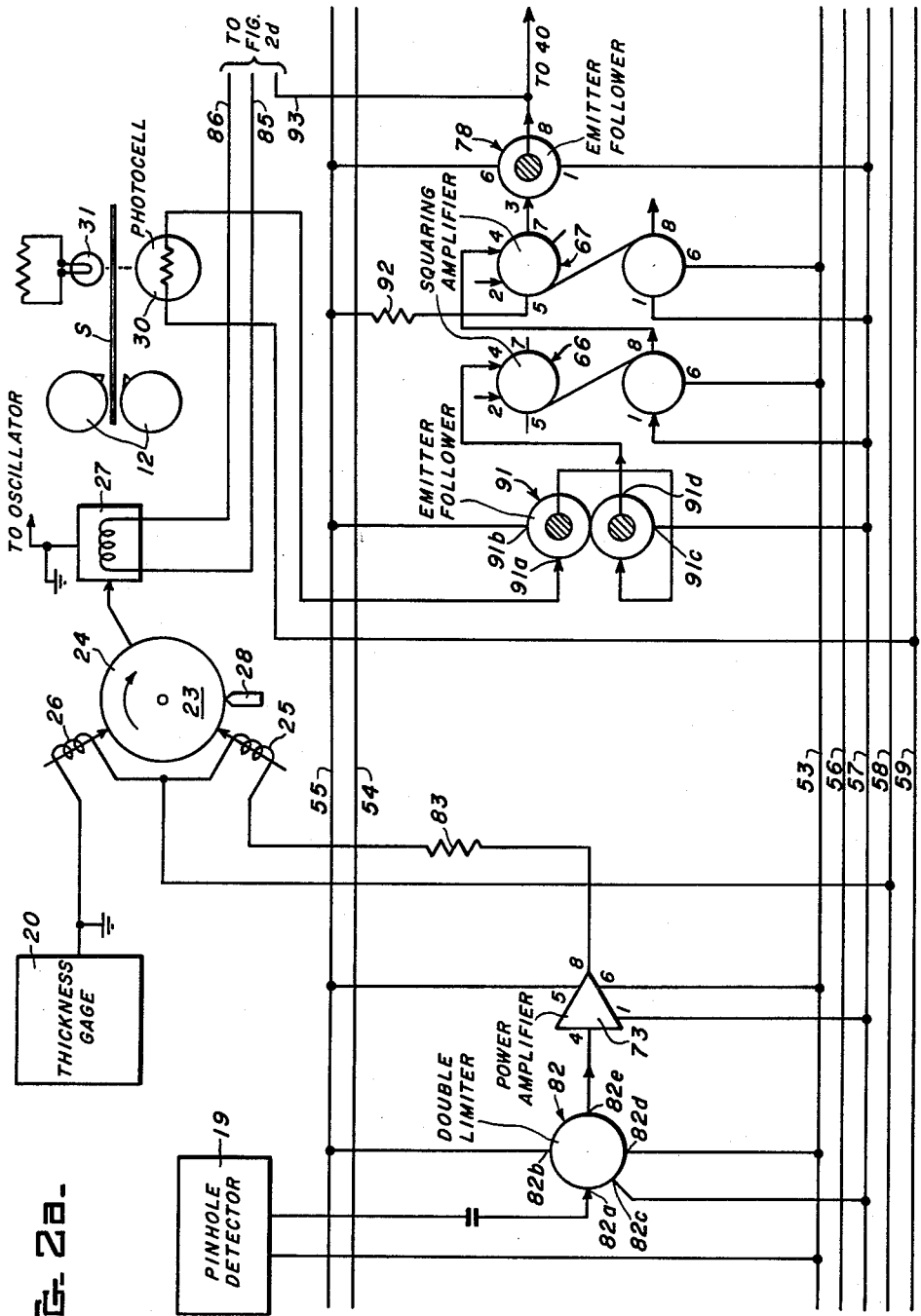

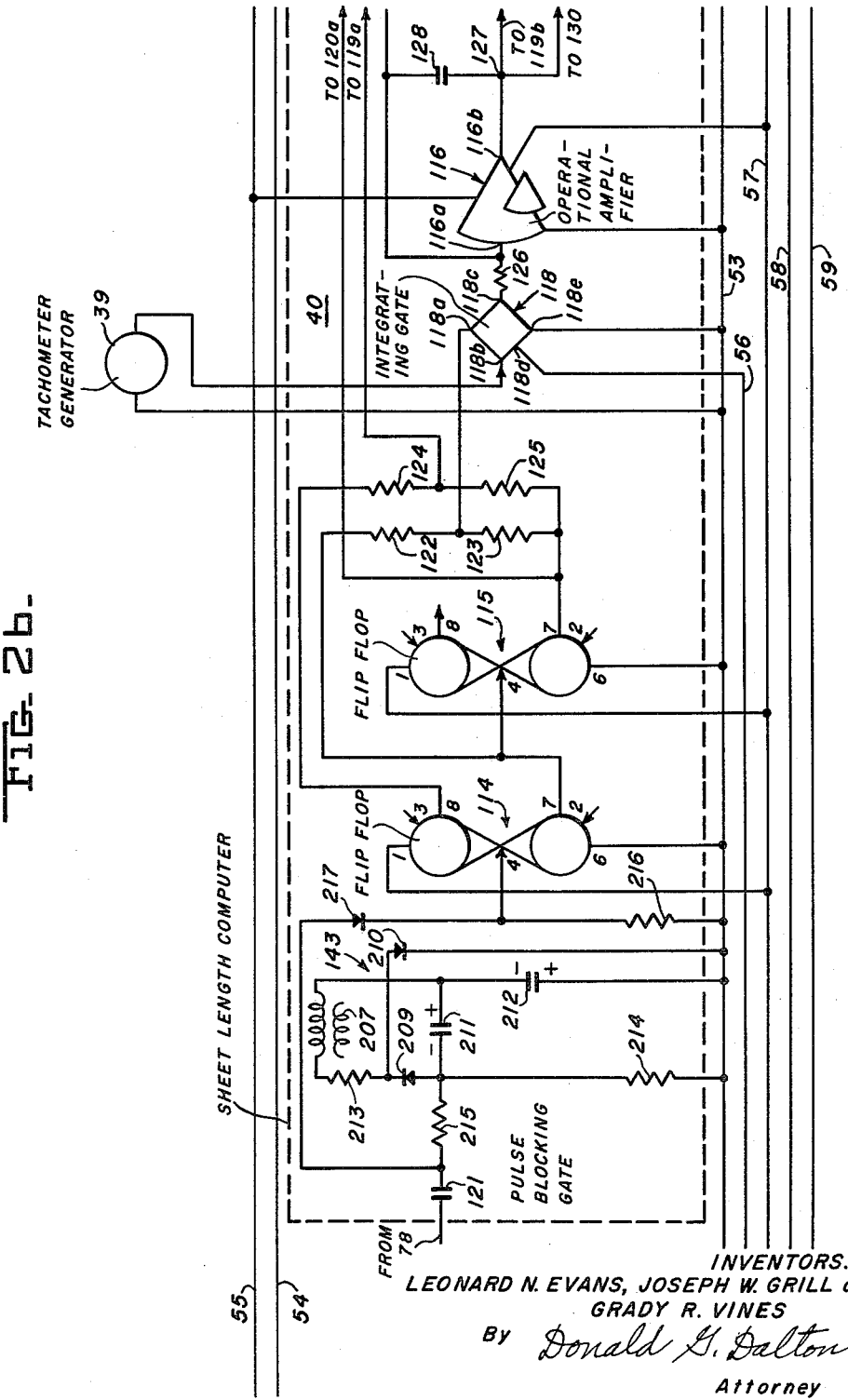

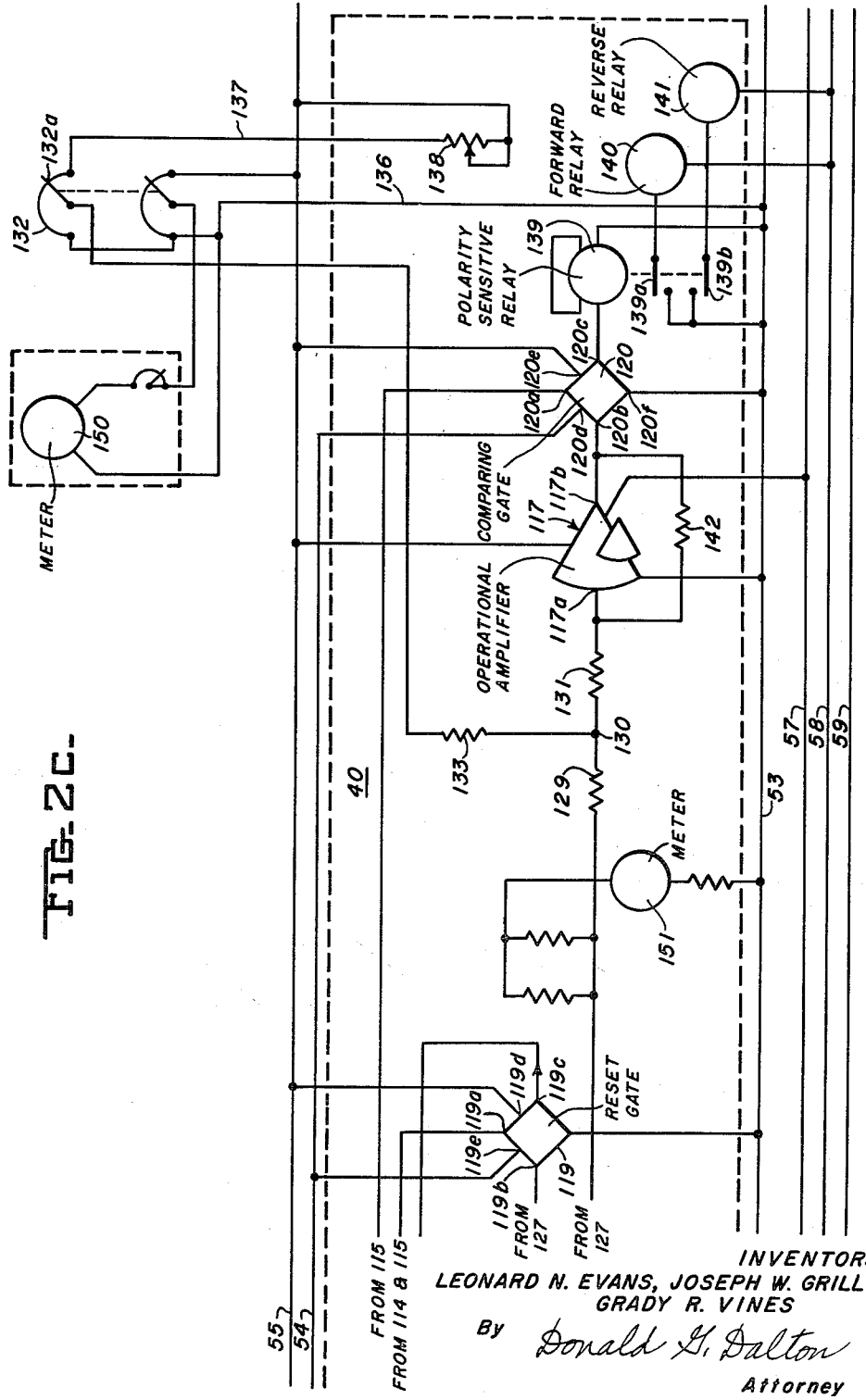

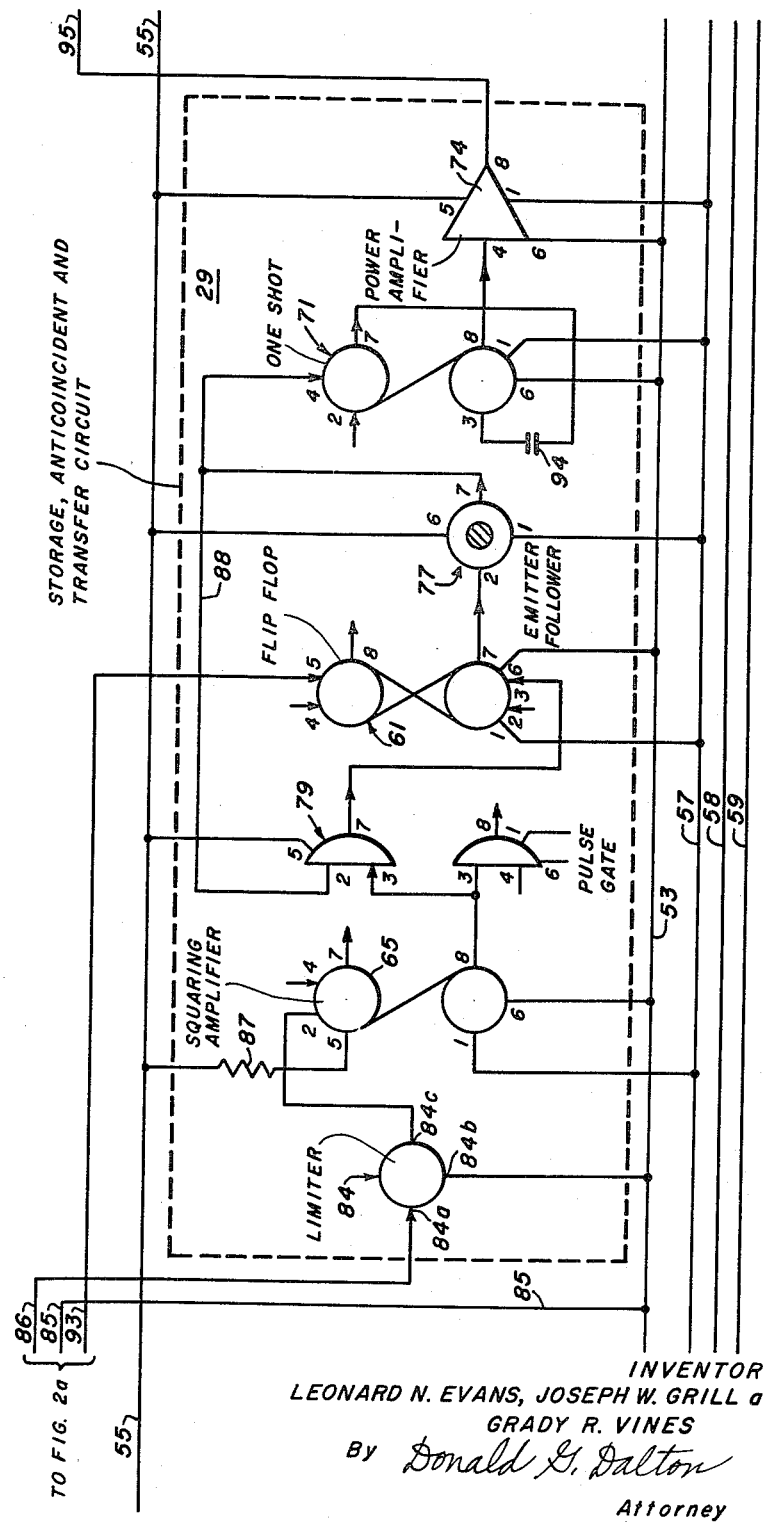

L. N. EVANS ETAL 3,180,122

SHEET CLASSIFIER

Filed Feb. 6, 1962

INVENTORS.
LEONARD N. EVANS, JOSEPH W. GRILL and
GRADY R. VINES
By Donald G. Dalton
Attorney

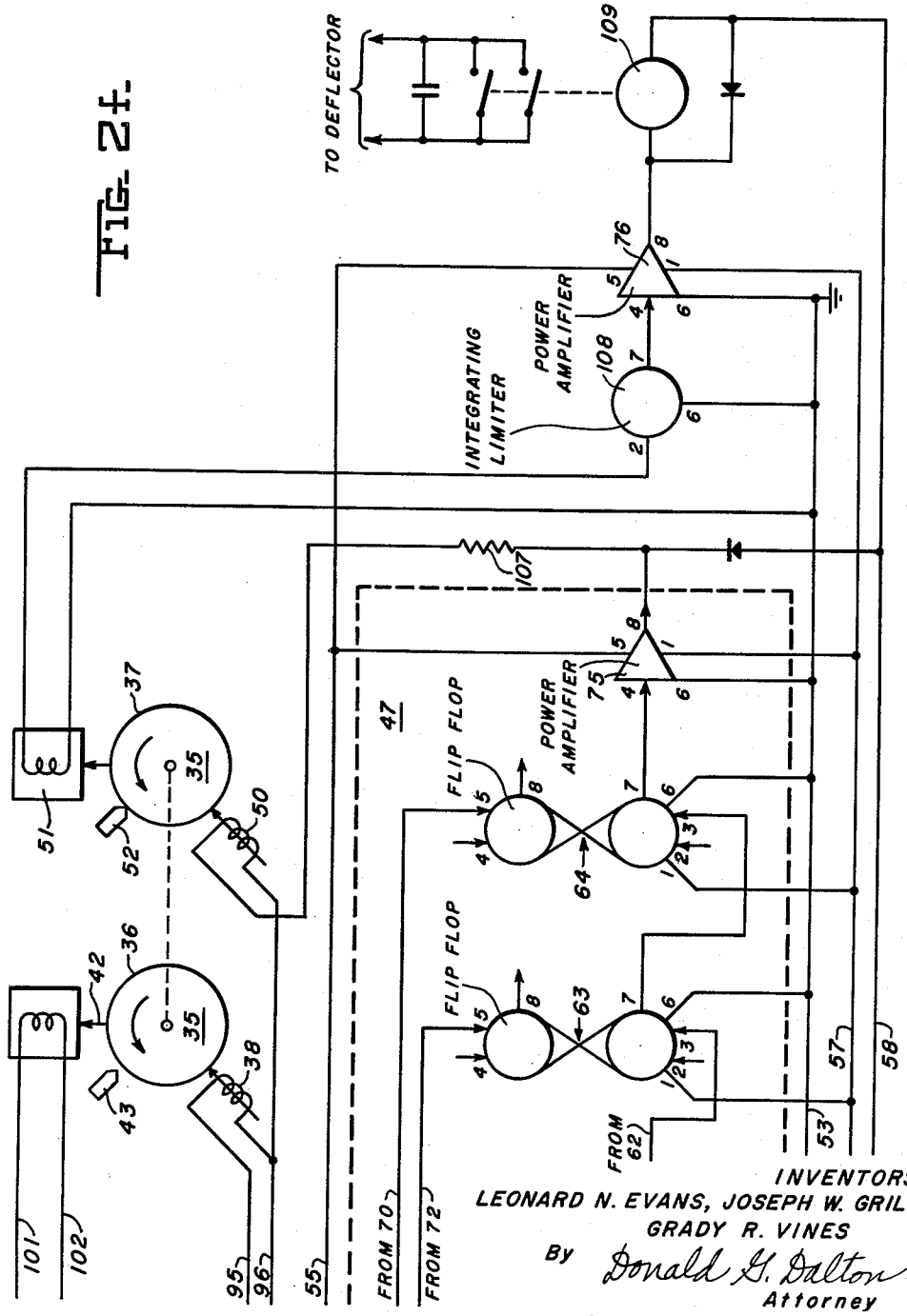

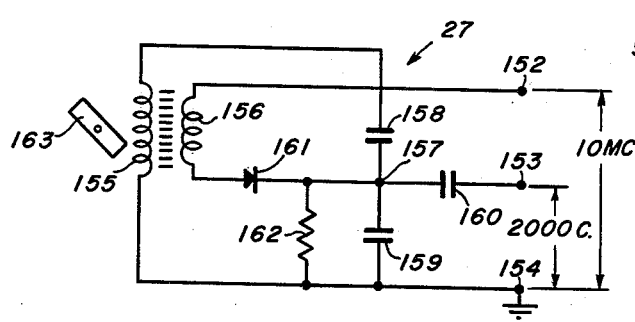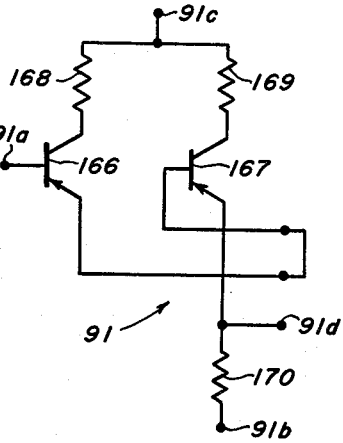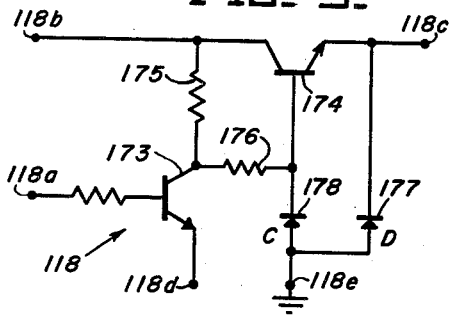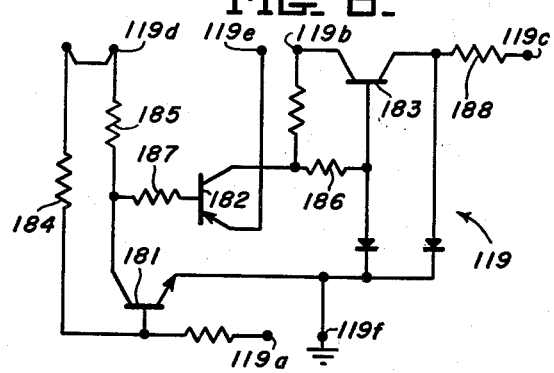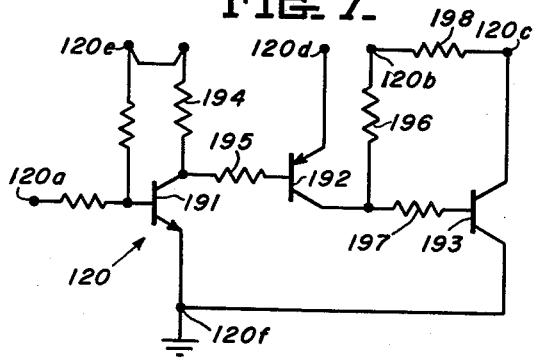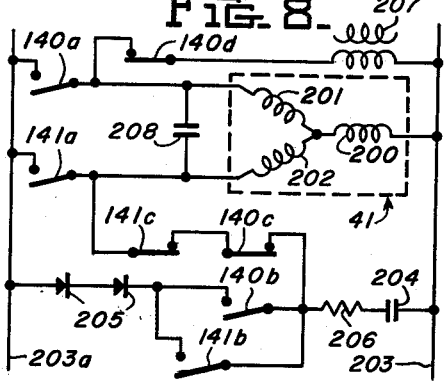
INVENTORS.
LEONARD N. EVANS, JOSEPH W. GRILL and
GRADY R. VINES
By Donald G. Dalton
Attorney

United States Patent Office 3,180,122
Patented Apr. 27, 1965

3,180,122
SHEET CLASSIFIER
Leonard N. Evans, Fairfield, Joseph W. Grill, Birmingham, and Grady R. Vines, Lipscomb, Ala., assignors to United States Steel Corporation, a corporation of New Jersey
Filed Feb. 6, 1962, Ser. No. 171,404
20 Claims. (Cl. 72—12)

This invention relates to an improved method and apparatus for classifying sheets as they are cut from a continuous strip.

Conventionally a shear line for cutting strip material into individual sheets includes automatic inspection devices (for example a pinhole detector and/or a thickness gage) which locate faults in the strip before it reaches the shear. A conveyor carries individual sheets from the shear to separate prime and reject sheet pilers. A deflector at the discharge end of this conveyor normally routes prime sheets to the prime piler, but after a fault has been detected in the strip, the deflector operates automatically at the proper moment to divert the sheet containing he fault to the reject piler. Many forms of classifying apparatus are known for timing operation of the deflector to coincide with the arrival of the faulty sheet.

Our invention concerns improvements to the sheet classifying method and apparatus shown in Camp Patent No. 2,950,640, commonly known as the "single sheet classifier." This classifier includes two magnetic recording tracks driven at a rate proportional to the strip speed. Whenever a fault is detected in the strip, a spot on the first track is magnetized. As the fault reaches the shear, the magnetized spot reaches a pickup, which it energizes to cock an electronic storage circuit. When the shear makes its next cut, it triggers the storage circuit, which thus identifies the sheet just cut as faulty, but at this stage the reference is the trailing edge of the faulty sheet. Each sheet next passes a photocell. If a sheet has been identified as faulty, a segment on the second track is magnetized, beginning when the leading edge of the faulty sheet darkens the photocell and terminating when the trailing edge exposes the photocell. Just before the leading edge of the faulty sheet reaches the deflector, the beginning of the magnetized segment reaches another pickup which initiates operation of the deflector. As the trailing edge passes the deflector, the end of the magnetized segment passes the latter pickup to reset the deflector. High speed lines embody a quick-acting deflector of the magnetic roll type. Since the deflector operates and resets precisely in accordance with the leading and trailing edges of a faulty sheet, the classifier is capable of diverting only a single faulty sheet each time it operates, as against a minimum of about three sheets diverted on each operation of some types of classifiers.

An object of our invention is to provide a single sheet classifier and classifying method which can track the position of sheets as they pass through different mechanisms in a shear line where their travel is interrupted. An example is a shear line for galvanized steel strip in which there is an additional roller leveler between the shear and the pilers for further flattening sheets after they are cut from the strip.

A further object is to provide a single sheet classifier which includes electronic means for receiving fault signals from a recording track, storing them while sheets pass through an intervening device where their travel is interrupted (for example a roller leveler), and transferring such signals to another recording track as the sheets travel from the intervening device to the deflector.

A further object is to provide an improved single sheet classifier and classifying method in which the head for recording fault signals on a magnetic track is positioned automatically in accordance with the sheet length to represent the relative location of the leading edge of each sheet, while the intelligence for energizing the head originates from the trailing edge.

A further object is to provide an improved single sheet classifier and classifying method which periodically compute the proper position for the recording head on a magnetic track and automatically adjust the head to this position, whereby the position of the head always represents the relative location of the leading edges of sheets, even though the shear may cut sheets of varying lengths and the intelligence for energizing the head comes from the trailing edges of sheets.

In the drawings:

FIGURE 1 is a diagrammatic side elevational view of a shear line equipped with our improved classifier;

FIGURE 2a is a schematic showing of a portion of our operating circuits;

FIGURE 2b is a schematic showing of another portion of our circuits and forms a continuation of FIGURE 2a;

FIGURE 2c is a schematic showing of another portion of our circuits and forms a continuation of FIGURE 2b;

FIGURE 2d is a schematic showing of another portion and forms a continuation of FIGURE 2c;

FIGURE 2e is a schematic showing of another portion and forms a continuation of FIGURE 2d;

FIGURE 2f is a schematic showing of the rest of the circuits and forms a continuation of FIGURE 2e;

FIGURE 3 is a schematic showing of the slow-speed pickup we preferably use;

FIGURE 4 is a schematic showing of a modified emitter follower we use in our circuits;

FIGURE 5 is a schematic showing of an integrating gate we use in our circuits;

FIGURE 6 is a schematic showing of a reset gate we use in our circuits;

FIGURE 7 is a schematic showing of a comparing gate we use in our circuits; and

FIGURE 8 is a schematic showing of our head-positioning motor.

FIGURE 1 shows a portion of a conventional shear line in which a first roller leveler 10 feeds a continuous strip S from right to left to a flying shear 12. The shear cuts the strip into individual sheets $S_1$, $S_2$, $S_3$, $S_4$, etc. A first conveyor 13 carries these sheets in a row with gaps between adjacent sheets to a second roller leveler 14 which further flattens them. A second conveyor 15 carries the sheets from the second roller leveler to a deflector 16, which normally routes prime sheets to a prime piler 17 but is operable to divert faulty sheets to a reject piler 18. The line illustrated is typical of those used for shearing galvanized steel strip. Shear lines used for other products, such as electrolytic tinplate, do not ordinarily include a second roller leveler. Commonly sheets travel more rapidly through the second roller leveler than they travel on the conveyors; hence this interruption might tend to interfere with timing of the deflector operation.

A conventional pinhole detector 19 and thickness gage 20 are positioned in advance of the first roller leveler 10 to inspect the strip for faults before the shear cuts it into sheets. The first roller leveler drives a first memory wheel 23 which has a magnetic recording track 24 extending around its circumference. Recording heads 25 and 26 are electrically connected to the pinhole detector 19 and to the thickness gage 20 respectively and positioned adjacent this track. Whenever a fault is detected in the strip, one of the recording heads is energized momentarily and magnetizes a spot on the track. A pickup 27 is positioned adjacent the track and is energized when a magnetized spot on the track reaches it. A permanent magnet eraser 28 is positioned adjacent the track to remove magnetized spots after they pass the pickup. The memory wheel itself and the two recording heads can be of conventional construction; hence we have not shown them in detail. In a high speed line the pickup also can be of conventional construction, but in a lower speed line handling a galvanized product, we require a special pickup more fully described hereinafter.

A storage, anticoincident and transfer circuit 29 (hereinafter described) is electrically connected to pickup 27 and to a photocell 30, which is positioned between shear 12 and the first conveyor 13 immediately beneath the path of sheets leaving the shear. A cooperating light source 31 is positioned above the photocell, whereby the leading edge of the strip darkens the photocell each time it passes, and the trailing edge of each sheet cut from the strip subsequently exposes the photocell. This photocell is substantially equivalent to a switch operated by the shear as it cuts, as shown in the aforementioned Camp patent, but we find the photocell more accurately fixes the passing of sheet edges. Some types of shear may not always be in the same position as they make each cut. Since the first roller leveler 10 propels both the strip S and the first memory wheel 23, the ratio of the linear speed of the magnetic track 24 to the strip speed remains constant. The spacing of the recording heads 25 and 26 and pickup 27 around the track bears the same ratio to the spacing of the pinhole detector 19, thickness gage 20 and photocell 30. Thus a magnetized spot on the track reaches the pickup at the same instant the fault it represents reaches the photocell. When the pickup is energized, circuit 29 is cocked to store the fault signal, identifying the next sheet to be cut as faulty. When the trailing edge of the faulty sheet passes and exposes photocell 30, circuit 29 is triggered. Once this circuit is storing a fault signal, it does not react to additional fault signals until it has been thus triggered.

One of the conveyors 13 or 15 drives a second memory wheel 35 which has two magnetic recording tracks 36 and 37 extending around its circumference. If conveyors 13 and 15 travel at different speeds, we place these tracks on separate wheels driven by the respective conveyors. A recording head 38 is electrically connected to circuit 29 and positioned adjacent track 36. Whenever circuit 29 is triggered, the recording head 38 is energized momentarily and magnetizes a spot on track 36. Of course circuit 29 can be triggered only if it is already storing a fault signal when the trailing edge of a sheet exposes photocell 30. We automatically position our recording head 38 in accordance with the length of sheets $S_1$, etc., which shear 12 is cutting, whereby the location of the magnetized spot corresponds with the leading edge of the faulty sheet, even though the intelligence for magnetizing the spot originates when the trailing edge passes a given point. For this purpose our apparatus includes a tachometer-generator 39 driven from the first roller leveler 10, a sheet length computer 40 electrically connected to both tachometer 39 and photocell 30, and a reversible A.-C. head-positioning motor 41 electrically connected to the computer. We describe these parts more fully hereinafter. A pickup 42 is positioned adjacent track 36 and is energized when a magnetized spot on the track reaches it. A permanent magnet eraser 43 is positioned adjacent the track to remove magnetized spots after they pass the pickup. Again the memory wheel and recording head can be of conventional construction, but the pickup preferably is of the low speed type similar to the first pickup.

A roller leveler bypass logic circuit 47 (hereinafter described) is electrically connected to pickup 42 and to a second photocell 48, which is positioned between the second roller leveler 14 and the second conveyor 15 immediately beneath the path of sheets leaving the roller leveler. A cooperating light source 49 is positioned above the photocell, whereby the leading and trailing edges of each sheet successively darken and expose the photocell as the sheet passes. The speed ratios and spacing are such that a magnetized spot on track 36 reaches pickup 42 when the leading edge of a faulty sheet reaches the second roller leveler 14. Energizing the pickup transfers the fault signal to circuit 47, which stores the signal while the faulty sheet passes through the intervening second roller leveler. The length of the shortest sheet handled in the line, plus the length of gap between sheets, exceeds the length of the roller leveler 14. Thus when circuit 47 is storing a fault signal, the next leading edge passing photocell 48 is that of the faulty sheet.

A recording head 50 is electrically connected to circuit 47 and positioned adjacent track 37. We automatically position the recording head 50 in accordance with the sheet length, the same as the recording head 38. When the trailing edge of a faulty sheet exposes photocell 48, circuit 47 energizes the recording head 50, which commences to magnetize a segment of track 37. When the trailing edge of the sheet following a faulty sheet (if a prime) exposes the photocell, circuit 47 deenergizes the recording head, which ceases to magnetize the track. If successive sheets are faulty, the recording head magnetizes a continuous segment, as hereinafter explained. Thus the length of the magnetized segment is proportional to the length of a faulty sheet plus the length of gap between sheets, or to the combined length of successive faulty sheets plus gaps if there are more than one. A pickup 51 is positioned adjacent track 37 spaced from the recording head 50 and is energized as long as a magnetized segment on the track is passing it. A permanent magnet eraser 52 is positioned adjacent the track to remove magnetized segments after they pass the pickup. The recording head can be of conventional construction like the others, but the pickup preferably also is of the low speed type.

Deflector 16 is electrically connected to pickup 51 through a suitable operating circuit. When the pickup is energized, the deflector operates to divert sheets to the reject piler 18. When the pickup ceases to be energized, the deflector resets to route sheets to the prime piler 17. The speed ratios and spacing are such that the beginning of a magnetized segment on track 37 reaches the pickup when the leading edge of a faulty sheet is about two feet ahead of the deflector. If the next sheet is a prime, the deflector commences to reset when the trailing edge of the faulty sheet is about the same distance, less the gap length, from the deflector. If successive sheets are faulty, the deflector does not reset until all the faulty sheets have passed.

*Electric circuits*

FIGURES 2a to 2f show our electric circuit 29, 40 and 47 with individual components indicated only schematically. In separate figures we show details of components which are not conventional, as hereinafter noted. Our circuits include in common a grounded line 53, two lines 54 and 55 at positive D.-C. potentials with respect to line 53, and four lines 56, 57, 58 and 59 at negative D.-C. potentials with respect to line 53. For purposes of illustration, lines 54 and 55 can be at potentials of +7.5 and +12 volts respectively, and lines 56 to 59 at potentials of −7.5, −12, −12 and −23 volts respectively, although obviously these values are not critical. The various lines can be connected to any suitable power supply (not shown) for supplying the necessary potentials. It is understood our circuits include the usual shields and other protective devices, such as parallel opposed diodes where applicable, but we have omitted these devices from our showing in the interest of simplicity.

Our circuits (apart from the sheet length computer 40) include as components four reset flip-flops 61, 62, 63 and 64, six squaring amplifiers 65, 66, 67, 68, 69 and 70, two "one-shot" or monstable multivibrators 71 and 72, four power amplifiers 73, 74, 75 and 76, two emitter followers 77 and 78 and a pulse gate 79. Suitable components for our purpose are commercially available as packaged units. One supplier of such units is Engineered Electronics Company, Santa Ana, California, who describes them in a printed publication entitled "Packaged Circuit Modules." For convenience we describe our circuits as embodying these particular packaged units, and we follow the supplier's nomenclature in referring to various parts of each. Nevertheless the foregoing components per se are well known electronic devices, and it is apparent we can use other forms not necessarily packaged units without departing from our invention. Reference can be made to another printed publication entitled "Transistor Manual," fourth edition, published by General Electric Company, copyright 1959 for a more general description of these components. The components we illustrate utilize transistors, but we could substitute components which utilize vacuum tubes. The components of the sheet length computer 40 are discussed later.

A flip-flop or bistable multivibrator is an electronic device which has two stable current-conducting states and can be changed from one to the other by an outside stimulus. The reset flip-flops we illustrate are designated T103 by the supplier, and they have pins or terminals marked as follows:

(1) −12 v.
(2) Direct reset
(3) Reset
(4) Direct set
(5) Set
(6) 12 v. common
(7) Output
(8) Output We connect pin 1 of each of the four flip-flops in our circuit to line 57 (−12 volts) and pin 6 of each to the grounded line 53. A positive-going signal on the "set" pin 5 changes the "output" pin 7 to −3 volts and the "output" pin 8 to −11 volts. A positive-going signal on the "reset" pin 3 changes the voltages on the two "output" pins the other way. If the "output" pins already are at the voltages to which the signal would change them, the signal has no effect. Negative-going signals on either the "set" or "reset" pin have no effect. In the circuits illustrated, we feed operating signals from these flip-flops only via their "output" pins 7. We can conveniently connect indicating lights (not shown) to the "output" pins 8 to show whether the circuits are operating properly. In the absence of a fault signal, each of the "output" pins 7 remains at −3 volts.

A squaring amplifier, known also as a Schmitt trigger or simply a D.-C. switch, it an electronic device for converting a sine wave input (approximately) into a square wave output (approximately). Thus it converts signals which have slow rise and fall times into signals which have fast rise and fall times. The squaring amplifiers we illustrate are designated T106 by the supplier, and they have pins or terminals marked as follows:

(1) −12 v.
(2) A.-C. Input
(3)
(4) Direct input
(5)
(6) 12 v. common
(7) Inverted output
(8) Normal output We connect pin 1 of each of the six squaring amplifiers in our circuit to line 57 (−12 volts) and pin 6 of each to the grounded line 53. Negative-going signals on the "direct input" pin 4 produce positive-going signals on the "inverted output" pin 7 and produce negative-going signals on the "normal output" pin 8.

A "one-shot" or monostable multivibrator is an electronic device which has a single stable current-conducting state, but gives out a single pulse in response to an outside stimulus. The "one shots" we illustrate are designated T105 by the supplier, and they have pins or terminals marked as follows:

(1) −12 v.
(2) Output "O"
(3)
(4) Input
(5) Direct trigger input
(6) 12 v. common
(7) Output "O"
(8) Output "I"

We connect pin 1 of each of the two "one-shots" in our circuit to line 57 (−12 volts) and pin 6 of each to the grounded line 53.

An emitter follower is an electronic device which offers high impedance to an input signals and low impedance to an output signal. The emitter followers we illustrate are designated T115 by the supplier. Each packaged unit contains two emitter followers in parallel, which we use separately in our circuit, and it has pins or terminals marked as follows:

(1) −12 v.
(2) Input #1
(3) Input #2
(4)
(5)
(6) +12 v.
(7) Output #1
(8) Output #2

We connect pin 1 of the unit to line 57 (−12 volts) and pin 6 to line 55 (+12 volts).

A power amplifier amplifies power without changing the voltage. The power amplifiers we illustrate are designated T128 Relay Drivers by the supplier, and they have pins or terminals marked as follows:

(1) −12 v.
(2)
(3)
(4) Input
(5) +12 v.
(6) 12 v. common
(7)
(8) Output

We connect pin 1 of each of the four power amplifiers in our circuit to line 57 (−12 volts), pin 5 of each to line 55 (+12 volts), and pin 6 of each to the grounded line 53.

A pulse gate is a device for stopping additional pulses after one pulse has passed until it is reset. The pulse gate we illustrate is designated T410A by the supplier, and it has pins or terminals marked as follows:

(1) −12 v.
(2) Control input "F"
(3) Pulse input "H"
(4) Control input "G"
(5) +12 v.
(6) 12 v. common
(7) Output $K=F(H)$
(8) Output $L=G(H)$ As FIGURE 2a shows, we connect the pinhole detector 19 to the grounded line 53 and to the input terminal 82a of a double limiter 82. We connect power input terminals 82b and 82c of the double limiter across lines 55 (+12 volts) and 57 (−12 volts), and connect another terminal 82d thereof to the grounded line 53. When the pinhole detector locates a fault, it transmits both positive and negative current pulses. The double limiter is a conventional device for limiting the voltage of these pulses in both directions. We connect the output terminal 82e of the double limiter to the "input" pin 4 of the aforementioned power amplifier 73. We connect the "output" pin 8 of the power amplifier to one side of the recording head 25 via a resistor 83, and the other side of the recording head to line 58. With this arrangement, every fault signal from the pinhole detector produces the same form of magnetized spot on track 24. We connect the other recording head 26 directly to the thickness gage 20, as FIGURE 2a shows.

*Storage, anticoincident and transfer circuit*

As FIGURE 2d shows, our storage, anticoincident and transfer circuit 29 includes first a conventional limiter 84 and the aforementioned squaring amplifier 65 and pulse gate 79. Conductors 85 and 86 extend from opposite sides of pickup 27 to the grounded line 53 and to the input terminal 84a of the limiter. We connect another terminal 84b of the limiter to the grounded line 53, and the output terminal 84c thereof to the "A.-C. input" pin 2 of the squaring amplifier 65. We connect pin 5 of the squaring amplifier to line 55 via a bias resistor 87, the "normal output" pin 8 of the squaring amplifier to the "pulse input" pin 3 of the aforementioned pulse gate 79, pin 5 of the pulse gate to line 55, and the "output" pin 7 of the pulse gate to the "reset" pin 3 of the aforementioned flip-flop 61. When a magnetized spot on track 24 energizes pickup 27, both a positive pulse and a negative pulse feed to the limiter 84, which grounds the positive and feeds only the negative to the squaring amplifier 65 and thence to the pulse gate 79. As this negative pulse drops off, it produces a positive-going signal on the "reset" pin 3 of flip-flop 61. This signal changes the "output" pin 7 of flip-flop 61 to −11 volts, thus cocking circuit 29 and storing the fault signal. We connect the "output" pin 7 of flip-flop 61 to the "input" pin 2 of the aforementioned emitter follower 77. A conductor 88 extends from the "output" pin 7 of the emitter follower to the "control input" pin 2 of the pulse gate 79. When the "output" pin 7 of flip-flop 61 changes to −11 volts, the resulting negative-going signal feeds through the emitter follower 77 to the pulse gate, whereupon the pulse gate blocks further pulses. Thus additional faults in the same sheet do not actuate the remainder of the circuit beyond the pulse gate.

As FIGURE 2a shows, we connect opposite sides of the first photocell 30 to line 59 (−23 volts) and to the input terminal 91a of an emitter follower 91, which is modified from the commercial unit to furnish stronger signals and is described in more detail hereinafter. We connect power input terminals 91b and 91c of the emitter follower 91 to lines 55 (+12 volts) and 57 (−12 volts) respectively. We connect the output terminal 91d thereof to the "direct input" pin 4 of the aforementioned squaring amplifier 66, the "normal output" pin 8 of the squaring amplifier 66 to the "direct input" pin 4 of the aforementioned squaring amplifier 67, pin 5 of the squaring amplifier 67 to line 55 via a bias resistor 92, the "inverted output" pin 7 of the squaring amplifier 67 to the "input" pin 3 of the other aforementioned emitter follower 78, and the output pin 8 of the latter to the "set" pin 5 of flip-flop 61 via a conductor 93. When the trailing edge of any sheet exposes photocell 30, the current flow therethrough increases in the negative direction, but the increase is gradual as the edge progressively exposes the photocell, and the output signal from the emitter follower has the same wave shape as the input signal. The squaring amplifier produces a pulse with a fast rise time and fall time, the pulse from the "normal output" pin 8 again being negative. The next squaring amplifier 67 produces a pulse which has even a faster rise time and fall time, but the pulse from its "inverted output" pin 7 is a positive-going signal. The emitter follower 78 is a power amplifier for this positive signal, which feeds to the flip-flop 61 to trigger circuit 29, provided it is storing a fault signal; otherwise it has no effect. On triggering, the "output" pin 7 of flip-flop 61 returns to −3 volts, whereupon a positive-going signal feeds via conductor 88 (FIGURE 2d) to the "control input" pin 2 of the pulse gate 79 to enable the latter again to pass fault signals.

As FIGURE 2d shows, we connect the "output" pin 7 of the emitter follower 77 also to the "input" pin 4 of the aforementioned "one-shot" 71, and the "output" pin 8 of the "one-shot" to the "input" pin 4 of the aforementioned power amplifier 74. We connect a condenser 94 across pins 3 and 7 of the "one-shot." A conductor 95 extends from the "output" pin 8 of the power amplifier to one side of the recording head 38 on track 36 (FIGURE 2f), and a conductor 96 extends from the other side of the recording head to line 58. The negative-going signal which flip-flop 61 feeds as the circuit is cocked does not act on the "one-shot," but when the "output" pin 7 of the flip-flop returns to −3 volts, the flip-flop feeds a positive-going signal through the emitter follower 77 to the "one-shot." The "one-shot" converts this signal (originally only a voltage change) to a pulse of sufficient length to be recorded. This pulse momentarily energizes the recording head 38 and magnetizes a spot on track 36. As we mentioned previously, we automatically position this recording head to correspond with the leading edge of a sheet; hence the magnetized spot tracks the leading edge of a faulty sheet from the position it occupies when the trailing edge passes the first photocell 30 until the leading edge reaches the second roller leveler 14. The distance the leading edge travels between these positions is the "tracking distance."

*Roller leveler bypass logic circuit*

As FIGURE 2e shows, our roller leveler bypass logic circuit includes first a limiter 100 (similar to limiter 84) and the aforementioned squaring amplifier 68 and flip-flop 62. Conductors 101 and 102 extend from opposite sides of pickup 42 (FIGURE 2f) to the grounded line 53 and to the input terminal 100a of the limiter 100. We connect the output terminal 100c of the limiter to the "A.-C. input" pin 2 of the squaring amplifier 68, pin 5 of this squaring amplifier to line 55 via a bias resistor 103, and the "normal output" pin 8 thereof to the "reset" pin 3 of flip-flop 62. When a magnetized spot on track 36 energizes pickup 38, the limiter 100 grounds the positive current pulses and passes only the negative to the squaring amplifier 68. When the negative pulse from the "normal output" pin 8 of the squaring amplifier drops off, the resulting positive-going signal changes the "output" pin 7 of flip-flop 62 to −11 volts. As already mentioned, this action takes place when the leading edge of a faulty sheet reaches the second roller leveler 14. Thus circuit 47 now stores the fault signal while the faulty sheet passes through the second roller leveler.

We connect opposite sides of the second photocell 48 to line 59 (−23 volts) and to the input terminal 104a of an emitter follower 104 (similar to the emitter follower 91). We connect the output terminal 104d of the emitter follower to the "direct input" pin 4 of the aforementioned squaring amplifier 69, the "normal ouput" pin 8 of the squaring amplifier 69 to the "direct input" pin 4 of the aforementioned squaring amplifier 70, pin 5 of the squaring amplifier 70 to line 55 via a bias resistor 105, the "normal output" pin 8 of the squaring amplifier 70 to the "set" pin 5 of flip-flop 62, and the "output" pin 7 of flip-flop 62 to the "reset" pin 3 of flip-flop 63. When the leading edge of any sheet covers photocell 48, a positive-going signal feeds through the emitter-follower 104 and squaring amplifiers 69 and 70 to the "set" pin 5 of flip-flop 62. If the "output" pin 7 of the flip-flop is at −11 volts by reason of a fault in the sheet, this signal returns the pin to −3 volts. The resulting positive-going signal changes the "output" pin 7 of flip-flop 63 to −11 volts. Thus as soon as the leading edge of a faulty sheet covers photocell 48, the fault signal is transferred to flip-flop 63, leaving flip-flop 62 clear to receive other fault signals.

We connect the "inverted output" pin 7 of the squaring amplifier 70 both to the "set" pin 5 of the aforementioned flip-flop 64 and to the "input" pin 4 of the "one-shot" 72. We connect the "output" pin 8 of the "one-shot" 72 to the "set" pin 5 of flip-flop 63, and the "output" pin 7 of flip-flop 63 to the "reset" pin 3 of flip-flop 64. We also connect a relatively small capacitance 106 across pins 3 and 7 of the "one-shot." When the trailing edge of a sheet exposes photocell 48, a negative-going signal feeds through the emitter follower 104 and squaring amplifiers 69 and 70. The latter feeds a positive-going signal from its "inverted output" pin 7 to the "set" pin 5 of flip-flop 64 to assure that this flip-flop is clear of previous fault signals and ready to receive a new signal should one arrive. The squaring amplifier 70 also feeds a positive-going signal from its inverted output pin 7 to the "one-shot" 72, which begins its cycle time of approximately 12 microseconds. During the cycle the "output" pin 8 of the "one-shot" changes to −11 volts and afterwards returns to −3. Thus on the return a positive-going signal feeds to the "set" pin 5 of flip-flop 63. If flip-flop 63 is storing a fault signal, its "output" pin 7 returns to −3 volts. The resulting positive-going signal feeds to the "reset" pin 3 of flip-flop 64, and changes the "output" pin 7 of the latter to −11 volts.

As FIGURE 2f shows, we connect the "output" pin 7 of flip-flop 64 to the "input" pin 4 of the aforementioned power amplifier 75, the "output" pin 8 of the power amplifier to one side of the recording head 50 via a resistor 107, and the other side of the recording head to line 58 (−12 volts) via conductor 96. When the "output" pin 7 of flip-flop 64 changes to −11 volts (trailing edge of faulty sheet exposes photocell 48), it feeds a negative-going signal to the power amplifier 75. The latter commences to feed a continuous signal which energizes the recording head 50 to magnetize a segment on track 37. When the "output" pin 7 of flip-flop 64 returns to −3 volts (trailing edge of following sheet exposes photocell 48), the signal from the power amplifier ceases and the recording head 50 is deenergized. If the sheet following a faulty sheet also is faulty, flip-flop 62 receives another fault signal when the leading edge of the following sheet reaches the second roller leveler 14. When the leading edge of the second faulty sheet covers photocell 48, the fault signal transfers to flip-flop 63, as before, and its "output" pin 7 again goes to −11 volts. When the trailing edge of the second faulty sheets exposes the photocell, flip-flop 63 feeds a new fault signal to flip-flop 64, which merely continues to feed an energizing signal to the recording head.

We connect opposite sides of pickup 51 to the grounded line 53 and to a conventional integrating limiter 108, which converts A.-C. signals from the pickup to D.-C. for operating the deflector 16. We connect the limiter to the "input" pin 4 of the aforementioned power amplifier 76 and the "output" pin 8 of the latter to one side of a coil 109 of a relay which controls the deflector. We connect the other side of coil 109 to line 58. Thus whenever pickup 51 is energized, the deflector operates to divert a sheet. When the pickup is deenergized, the deflector resets.

*Sheet length computer*

Our sheet length computer 40 includes as components two triggered flip-flops 114 and 115 and two chopper-stabilized operational amplifiers 116 and 117. Suitable components for our purpose are commercially available as packaged units. One supplier of a suitable flip-flop is the aforementioned Engineered Electronics Company, who describes it in the same printed publication. One supplier of a suitable operational amplifier is Burr-Brown Research Corporation, Tucson, Arizona. Nevertheless the foregoing components per se are well known electronic devices, and it is apparent we can use other forms not necessarily packaged units without departing from our invention. Reference can be made to the aforementioned publication entitled "Transistor Manual" for a more general description of the flip-flop, and to another printed publication entitled "Analog Computer Techniques" by Clarence J. Johnson, published by McGraw-Hill Book Company, Inc. Copyright 1956, chapter 10, page 184, for a description of an operational amplifier, known also as a stabilized D.-C. amplifier. Again the components we illustrate utilize transistors, but we could substitute components which utilize vacuum tubes.

The triggered flip-flops differ somewhat from the reset flip-flops we described previously. The triggered flip-flops we illustrate are designated T-102A by the supplier, and they have pins or terminals marked as follows:

(1) −12 v.
(2) Base input
(3) Base input
(4) Trigger input
(5)
(6) 12 v. common
(7) Output
(8) Output We connect pin 1 of each of the two flip-flops in our circuit to line 57 (−12 volts and pin 6 to the grounded line 53. One of the "output" pins 7 or 8 of each is at −3 volts and the other at −10 volts. When a positive-going signal is applied to the "trigger input" terminal 4 of either flip-flop, the voltages on its two "output" terminals reverse. Negative-going signals have no effect.

An operational amplifier is a high gain direct coupled amplifier which provides a phase inversion between its input and output terminals; that is, negative inputs give positive outputs and vice versa. These amplifiers, when used without chopper stabilizers, can provide gains up to the order of 100,000 or more. When used with chopper stabilizers, the combination can provide gains up to 10,000,000 or more. These gain figures are open loop gains or gains with no negative feedback components. When precision input and feedback impedances are used, the amplifier can be used as a computing device which provides accurate sums of input voltages or provides an output which is the integral of the input. The amplifier with suitable input and feedback components, and suitable gating components can be used as an analog memory circuit. Because of the high gain, the operational amplifiers are capable of charging a condenser at a linear rate. We connect each of the two operational amplifiers in our circuit across lines 55 and 57 and to the grounded line 53 as shown in FIGURES 2b and 2c respectively.

As FIGURES 2b and 2c show, our circuit 40 also includes an integrating gate 118, a reset gate 119, and a comparing gate 120. We describe these gates in more detail hereinafter, but for now we point out they have respective "control input" terminals 118a, 119a and 120a, "current input" terminals 118b, 119b and 120b, and "output" terminals 118c, 119c and 120c. Gates 118 and 119 are "on" (pass current) only when their "control input" terminals at −10 volts. Gate 120 always can pass a positive current, but is "on" (passes negative and positive currents) only when its "control input" terminal is at −3 volts. We connect the "output" pin 8 of the emitter follower 78 (FIGURE 2a) to the "trigger input" pin 4 of flip-flop 114 via a capacitance 121, and the "output" pin 7 of flip-flop 114 to the "trigger input" pin 4 of flip-flop 115. We connect the "control input" terminal 118a to "output" pins 7 of both flip-flops 114 and 115 via resistors 122 and 123 respectively. We connect the "control input" terminal 119a to the "output" pins 8 of flip-flop 114 and 7 of flip-flop 115 via resistors 124 and 125 respectively. We connect the "control input" terminal 120a to the "output" pin 7 of flip-flop 115. The effective voltage on the "control input" terminals 118a and 119a equals the average of the two individual voltages applied thereto. For example, when the "output" pin 7 of flip-flop 114 is at −3 volts and the output pin 7 of flip-flop 115 at −10 volts, the effective voltage on terminal 118a is approximately −6.5. The effective voltage on the "control input" terminal 120a of course equals the voltage on the output 7 of flip-flop 115, either −10 or −3.

As already explained, each time the trailing edge of a sheet exposes the first photocell 30, the emitter follower 78 transmits a positive pulse, which of course reverses the voltages on the "output" pins of flip-flop 114. When the "output" pin 7 of flip-flop 114 changes from −10 volts to −3 volts, the resulting positive-going signal reverses the voltages on the output pins of flip-flop 115. Thus our sheet length computer operates on a four-sheet cycle, during which the voltages change as follows:

|  | Flip-flop 114 | | Flip-flop 115 | | Control input terminal | | |
|---|---|---|---|---|---|---|---|
|  | Pin 7, volts | Pin 8, volts | Pin 7, volts | Pin 8, volts | 118a, volts | 119a, volts | 120a, volts |
| Initially | −3 | −10 | −10 | −3 | [1] −6.5 | [2] −10 | [1] −10 |
| Step I: Trailing edge of sheet S₁ exposes photocell 30 | −10 | −3 | −10 | −3 | [2] −10 | [1] −6.5 | [1] −10 |
| Step II: Trailing edge of sheet S₂ exposes photocell 30 | −3 | −10 | −3 | −10 | [1] −3 | [1] −6.5 | [2] −3 |
| Step III: Trailing edge of sheet S₃ exposes photocell 30 | −10 | −3 | −3 | −10 | [1] −6.5 | [1] −3 | [2] −3 |
| Step IV: Trailing edge of sheet S₄ exposes photocell 30 | [3] | [3] | [3] | [3] | [3] | [3] | [3] |

[1] Gate off.
[2] Gate on.
[3] All voltages return to their initial values.

We connect one side of the tachometer-generator 39 to the grounded line 53 and the other side to the "current input" terminal 118b of the integrating gate 118. We connect the "output" terminal 118c to the input terminal 116a of the operational amplifier 116 via an input resistor 126. We connect a common terminal 127 to (a) the "output" terminal 116b of the operation amplifier, (b) one side of the capacitance 128, (c) the "input" terminal 119b of the reset gate 119, and (d) via a resistor 129 to another common terminal 130. We connect the other side of capacitance 128 back to the input side of the operational amplifier. During step I of the computing cycle gate 118 passes current from the tachometer 39 through the operational amplifier 116. Since gate 119 is "off," the output of the operational amplifier charges condenser 128 with a negative voltage whose magnitude is a function of (a) the tachometer voltage, and (b) the length of time the tachometer voltage is applied. Since the tachometer voltage is proportional to the strip speed, and the time is the interval it takes for the edges of successive sheets to pass a given point, the condenser voltage reaches a magnitude proportional to the sheet length at the end of step I. Mathematically the relation can be expressed:

$$\text{length of sheet in inches} = \frac{K_1}{K_2}\int_0^{t_1}\int_0^{f(t)} dv\,dt$$

in which $f_{(t)}$ is the tachometer voltage, $t$ is the time the voltage charges the condenser, $K_1$ is the maximum sheet in inches divided by the maximum desired output of the integrator, and $K_2$ is an integration time constant equal to the product (tachometer volt-seconds per revolution) × (tachometer revolutions per inch of line travel) × $K_1$ We connect the common terminal 130 to (a) the "input" terminal 117a of the operational amplifier 117 via an input resistor 131, and (b) the movable arm 132a of a potentiometer 132 via a resistor 133. Conductors 136 and 137 extend from opposite sides of the slide wire of potentiometer 132 to the grounded line 53 and via a resistor 138 to line 55 (+12 volts). The movable arm 132a is mechanically connected to the recording heads 38 and 50, whereby its position on the slide wire represents the instant position of the recording heads. Thus the potentiometer continuously feeds to terminal 130 a positive voltage of a magnitude proportional to the instant position of the recording heads. The integrator (that is, condenser 128) feeds to this terminal a negative voltage which varies from zero at the beginning of step I to a magnitude proportional to the sheet length during steps II and III. If the recording heads are positioned properly, the two voltages of course balance. If the recording heads should be positioned for longer or shorter sheets, the two voltages are unbalanced in the negative or positive direction respectively.

We connect opposite sides of the coil of a polarity-sensitive relay 139 to the grounded line 53 and to the output terminal 120c of gate 120. The relay has contacts 139a which are connected in series with the coil of a "forward" relay 140, and contacts 139b which are connected in series with the coil of a "reverse" relay 141. We connect the coils of the last two relays to be energized via lines 53 and 58. We also connect a feedback resistor 142 across the operational amplifier 117. During steps II and III of our computing cycle, gate 120 can pass current in either direction between the operational amplifier 117 through the coil of relay 139 and ground. If the resultant voltage on terminal 130 is negative, the output of the operational amplifier is positive and vice versa. When it is necessary to position the recording heads 38 and 50 for longer sheets, current commences to flow from the operational amplifier during step I as soon as the negative voltage from the integrator reaches a magnitude greater than the positive voltage from the potentiometer, since gate 120 always allows current flow from a positive source. When it is necessary to position the heads for shorter sheets, current flows through relay 139 only during steps II and III of the computing cycle. When current flows through the coil of relay 139, its contacts 139a or 139b close depending on the direction, whereupon the forward or reverse relay 140 or 141 picks up. These relays control operation of the head-positioning motor 41, as hereinafter more fully described. During step IV of the computing cycle, gate 119 is "on" and feeds the output from condenser 128 through a small resistor (shown as part of the gate in FIGURE 6), whereby the next cycle begins with the integrator at zero voltage.

A typical shear line may be adjusted to cut sheets which vary in length from a minimum of 40 inches to a maximum of 200 inches. When we adjust the positions of the recording heads 38 and 50 for longer sheets, ordinarily there is sufficient time to perform the full adjustment from the minimum to the maximum during one computing cycle with the line operating at maximum speed, but there is not always sufficient time when we adjust for shorter sheets. Although the magnitude of adjustment may be the same, the longer the sheet the longer the cycle, and the adjustment for longer sheets begins sooner during the cycle. Conversely the shorter the sheet the shorter the cycle. Our computer 40 includes another gate 143 which blocks pulses from photocell 30 while the positions of the recording heads are adjusted for a shorter length sheet until they reach their final position of adjustment. We show the circuit of gate 143 in FIGURE 2b, but we describe its operation later after we describe the circuit of our head-positioning motor 41.

Computer 40 also preferably includes meters 150 and 151 for indicating the sheet length and for indicating the voltage output from the operational amplifier 116. We connect these meters as shown in FIGURE 2c, but do not describe them in detail since they are not functional components of the circuit.

Components

FIGURE 3 shows circuit details of our preferred low speed pickup 27, although we do not claim this pickup as our invention. The other pickups 42 and 51 are similar. The pickup has an input terminal 152, an output terminal 153, and a grounded terminal 154, and it includes a saturable reactor which has long and short windings 155 and 156. The input terminal is connected to one end of winding 156. The output terminal 153, both ends of the long winding 155, and one end of the short winding 156 are connected to a junction 157. Condensers 158 and 159 are interposed between the ends of the long winding 155 and this junction. Another condenser 160 is interposed between the junction and the output terminal. A rectifier 161 is interposed between the end of the short winding 156 and the junction. A load resistor 162 is connected between junction 157 and ground. A bias magnet 163 is positioned adjacent the reactor windings.

We connect an oscillator (not shown) across terminals 152 and 154 to furnish a high frequency A.-C. input (for example 10 megacycles). As long as no magnetized spot appears on the adjacent recording track 24, the reactor remains unsaturated, current flow is negligible through the short winding 156 and load resistor 162, and no signal appears across terminals 153 and 154. A magnetized spot on the recording track, combined with flux of the bias magnet, starts the core of the reactor toward saturation, whereupon current through the load resistor increases. A D.-C. change feeds back through the long winding 155 and further saturates the core. As long as the D.-C. is changing, it passes through condensers 158 and 160 to produce a signal across terminals 153 and 154. Once the D.-C. reaches a maximum, there is no more change and no more feed back, whereupon the D.-C. flow drops, changing in the other direction. This action repeats as long as a magnetized spot on the recording track is adjacent the pickup, and thus produces a lower frequency A.-C. (for example 2000 cycles) signal across terminals 153 and 154. We connect conductor 86 to terminal 153, as already explained. It is seen the pickup requires no movement of the recording track to feed a signal, only that a magnetic flux be adjacent. A conventional pickup feeds a signal only when there is relative movement between the lines of magnetic force and the pickup.

FIGURE 4 shows circuit details of our modified emitter follower 91. The other modified emitter follower 104 is similar. The emitter follower 91 includes two transistors 166 and 167 and three resistors 168, 169 and 170, connected as shown in the figure. In the absence of a negative signal from photocell 30 on the input terminal 91a, the base and collector currents through the two transistors are negligible, and no signal feeds from the output terminal 91d. When a negative signal feeds from terminal 91a to the base of transistor 166, the collector current increases and thus feeds a negative signal to the base of transistor 167. The collector current through transistor 167 likewise increases to feed a signal from the output terminal.

FIGURE 5 shows circuit details of our integrating gate 118. As already mentioned, this gate has a "control input" terminal 118a connected to flip-flops 114 and 115, a "current input" terminal 118b connected to the tachometer generator 39, and an "output" terminal 118c connected to the operational amplifier 116 through resistor 126. The gate also has a terminal 118d connected to line 56 (−7.5 volts) and a terminal 118e connected to the grounded line 53. The gate includes two transistors 173 and 174 of a type (for example 2N438) which cuts off when negative potentials with respect to its emitter are applied to its base. As long as the voltage feeding from the flip-flops to the "control input" terminal 118a and base of transistor 173 is −6.5 or −3, this transistor conducts. Current from the tachometer flows from terminal 118b through a resistor 175 and transistor 173 to terminal 118d and line 57. A sufficient negative potential feeds through a resistor 176 to the base of transistor 174 to cut off the latter transistor. When transistor 173 cuts off as its base goes to −10 volts, the negative potential is removed from the base of transistor 174, whereupon transistor 174 conducts the tachometer current to the "output" terminal 118c and the operational amplifier 116. The gate also includes diodes 177 and 178 for preventing leakage and limiting the cut-off voltage on the base of transistor 174. Any leakage through the gate would cause the integrator 128 to integrate improperly.

FIGURE 6 shows circuit details of our reset gate 119. As already mentioned, this gate has a "control input" terminal 119a connected to flip-flops 114 and 115, a "current input" terminal 119b connected to the common terminal 127, and an "output" terminal 119c connected to the integrator 128. The gate also has a terminal 119d connected to line 55 (+12 volts), a terminal 119e connected to line 54 (+7.5 volts) and a terminal 119f connected to the grounded line 53. The gate includes a transistor 181 similar to those used in the integrating gate 118, and two transistors 182 and 183 of a type (for example 2N404) which cuts off when positive potentials with respect to its emitter are applied to its base. As long as the voltage feeding from the flip-flops to the "control input" terminal 119a and base of transistor 181 is −6.5 or −3, this transistor conducts. Current from line 55 flows from terminal 119d through parallel resistors 184 and 185 to terminal 119f and ground. Transistor 182 also conducts, whereby a positive potential from line 54 and terminal 119e feeds through a resistor 186 to the base of transistor 183, which does not conduct. When transistor 181 cuts off as its base goes to −10 volts, a positive potential from line 55 feeds through resistor 185 and another resistor 187 to the base of transistor 182, which ceases to conduct. Thus the positive potential, is removed from the base of transistor 183, whereupon the latter conducts current from the integrator condenser 128 through a resistor 188 to discharge the condenser.

FIGURE 7 shows circuit details of our comparing gate 120. As already mentioned, this gate has a "control input" terminal 120a connected to flip-flop 115, a "current input" terminal 120b connected to the operational amplifier 117, and an "output" terminal 120c connected to the coil of relay 139. The gate also has a terminal 120d connected to line 54 (+7.5 volts), a terminal 120e connected to line 55 (+12 volts), and a terminal 120f connected to the grounded line 53. The gate includes a transistor 191 which cuts off when its base goes to −10 volts, and two transistors 192 and 193 of a type which cuts off when positive potential with respect to its emitter are applied to its base. As long as the voltage applied from the flip-flop to the "control input" terminal 120a and base of transistor 191 is −10, this transistor does not conduct. A positive potential feeds from line 55 and terminal 120e through resistors 194 and 195 to the base of transistor 192, which likewise does not conduct. If the output voltage from the operational amplifier 117 is positive (adjustment for longer sheets), a positive potential feeds through resistors 196 and 197 to the base of transistor 193, which likewise does not conduct. Thus the gate passes current from the operational amplifier 117 and terminal 120b through a resistor 198 to terminal 120c, whereby relay 139 can be energized. If the output voltage from the operational amplifier is negative (adjustment for shorter sheets) a negative potential feeds through resistors 196 and 197 to the base of transistor 193, which thus conducts negative current from the operational amplifier through transistor 193 to ground, whereby relay 193 cannot pick up. When the "input" terminal 120a goes to −3 volts, the base of transistor 191 is positive and the transistor conducts current from line 55 and terminal 120e to ground, whereupon the positive potential ceases to feed to the base of transistor 192. The latter transistor conducts and feeds a positive potential to the base of transistor 193, which ceases to conduct even though the potential from the operational amplifier may be negative. Thus a negative current is free to pass to energize relay 139.

FIGURE 8 shows circuit details of our head-positioning motor 41. The motor itself is of a type commercially available, known as a shaded-pole instantly reversible A.-C. motor. It has three windings 200, 201 and 202, and it is energized from lines 203 and 203a connected to a suitable A.-C. source. Normally open contacts 140a of relay 140 are connected in series with windings 200 and 201 across lines 203 and 203a. Similarly normally open contacts 141a of relay 141 are connected in series with windings 200 and 202 across these lines. When one of the relays picks up and its contacts close, the windings are energized to operate the motor in the appropriate direction. We also equip the motor with a dynamic braking circuit. This type of motor stops instantly when D.-C. is applied to its windings. The braking circuit includes a condenser 204 connected across lines 203 and 203a in series with a rectifier 205 and resistor 206, and with parallel normally open contacts 140b and 141b of the respective relays. When either relay picks up and its normally open contacts close, condenser 204 is charged while the motor is running. Normally closed contacts 140c and 141c are connected in series with resistor 206 and the motor windings. When the motor is running, the normally closed contacts of the relay which has picked up of course open. When the relay drops out and these contacts close, condenser 204 discharges through motor windings 200 and 202 and thus applies D.-C. to stop the motor with the recording heads properly positioned.

FIGURES 2b and 8 together show circuit details of gate 143, which blocks pulses from photocell 30 while an adjustment for shorter sheets takes place until the adjustment is completed. The gate includes a transformer 207 whose primary winding (FIGURE 8) is connected across lines 203 and 203a in series with normally closed contacts 140d of relay 140, a condenser 208, and normally open contacts 141a of relay 141. When an adjustment for longer sheets takes place, contacts 140d open to prevent operation of the gate. When an adjustment for shorter sheets takes place, the primary winding of transformer 207 is energized via contacts 141a and 140d. We connect the secondary winding (FIGURE 2b) of transformer 207 to a conventional full wave voltage doubler, which includes rectifiers 209 and 210, condensers 211 and 212, and resistors 213 and 214. When the transformer is energized and the terminal at the right of its secondary winding is positive with respect to the terminal at the left D.-C. flows from the left terminal via condenser 211, rectifier 209 and resistor 213 to the left terminal. When the terminal at the left of the secondary winding is positive with respect to the terminal at the right, D.-C. flows from the left terminal via resistor 213, rectifier 210 and condenser 212 to the right terminal. Thus both condensers 211 and 212 are charged, and their polarities are as indicated in FIGURE 2b. The voltage developed across resistor 214 equals the sum of the voltages developed across the two condensers, essentially double the voltage across either condenser by itself.

We connect the voltage doubler via resistors 215 and 216 to a reversed-biased diode 217. A diode is reversed-biased when a potential existing across its terminals is opposite in polarity to its normal conducting polarity. The negative bias voltage which is applied to diode 217 from the voltage doubler is of sufficient amplitude to block positive pulses from the emitter follower 73 from passing through the diode to flip-flop 114. Resistor 214 acts as a discharge path for condensers 211 and 212 when the voltage applied to the transformer is removed.

From the foregoing description it is seen that our invention affords a high precision single sheet classifier and classifying method. Contrasted with previous classifiers with which we are familiar, we automatically position the recording heads in accordance with the leading edges of sheets, and we make it possible to store signals while the normal travel of sheets is interrupted. We wish also to point out that parts of our invention are useful as subcombinations where other parts are not used. For example, our sheet length computer and head-positioning means might be used in a shear line which lacks the second roller leveler, where it would serve to position only a single recording head. Similarly our roller leveler bypass logic circuit might be used without the sheet length computer.

While we have shown and described only a single embodiment of the invention, it is apparent that modifications may arise. Therefore, we do not wish to be limited to the disclosure set forth but only by the scope of the appended claims.

We claim:
1. In a line for shearing strip material into individual sheets, which line includes a shear, means for feeding strip to said shear, prime and reject sheet pilers, a series of conveyors for carrying sheets from said shear to said pilers, means for inspecting the strip for faults before it reaches said shear, a deflector between said conveyors and said pilers normally routing prime sheets to said prime piler, but operable to divert a faulty sheet to said reject piler, and intervening means between two conveyors of said series through which sheets pass and where their travel is interrupted, the combination therewith of an apparatus for controlling operation of said deflector comprising recording means for tracking movement of a faulty sheet from said shear to said intervening means, another recording means for tracking movement of a faulty sheet from said interveing means to said deflectors, and an electronic circuit operatively connected with the two recording means for storing a signal that a sheet is faulty while the sheet passes through said intervening means and thereafter feeding the signal to said second-named recording means.

2. In a line for shearing strip material into individual sheets, which line includes a shear, means for feeding strip to said shear, prime and reject sheet pilers, a series of conveyors for carrying sheets from said shear to said pilers, means for inspecting the strip for faults before it reaches said shear, a deflector between said conveyors and said pilers normally routing prime sheets to said prime piler, but operable to divert a faulty sheet to said reject piler, and intervening means between two conveyors of said series through which sheets pass and where their travel is interrupted, the combination therewith of an apparatus for controlling operation of said deflector comprising recording means operatively connected with said inspecting means and with the conveyor which carries sheets from said shear to said intervening means for tracking the movement of a faulty sheet along this conveyor, another recording means operatively connected with the conveyor which carries sheets from said intervening means to said deflector for tracking the movement of a faulty sheet along the latter conveyor, and an electronic circuit operatively connected with the two recording means for storing a signal that a sheet is faulty while the sheet passes through said intervening means and thereafter feeding the signal to said second-named recording means.

3. In a line for shearing strip material into individual sheets, which line includes a shear, means for feeding strip to said shear, prime and reject sheet pilers, a series of conveyors for carrying sheets from said shear to said pilers, means for inspecting the strip for faults before it reaches said shear, a deflector between said conveyors and said pilers normally routing prime sheets to said prime piler, but operable to divert a faulty sheet to said reject piler, and intervening means between two conveyors of said series through which sheets pass and where their travel is interrupted, the combination therewith of an apparatus for controlling operation of said deflector comprising recording means for tracking movement of the leading edge of a faulty sheet from the position it occupies after said shear cuts the sheet from the strip until the leading edge reaches said intervening means, another recording means for tracking movement of both the leading and trailing edges of a faulty sheet from said intervening means to said deflector, and an electronic circuit operatively connected with the two recording means for storing a signal that a sheet is faulty while the sheet passes through said intervening means and thereafter feeding the signal to said second-named recording means.

4. In a line for shearing strip material into individual sheets, which line includes a shear, means for feeding strip to said shear, prime and reject sheet pilers, a series of conveyors for carrying sheets from said shear to said pilers, means for inspecting the strip for faults before it reaches said shear, a deflector between said conveyors and said pilers normally routing prime sheets to said prime piler, but operable to divert a faulty sheet to said reject piler, and intervening means between two conveyors of said series through which sheets pass and where their travel is interrupted, the combination therewith of an apparatus for controlling operation of said deflector comprising a recording track driven at a rate proportional to the speed of the conveyor which carries sheets from said shear to said intervening means, another recording track driven at a rate proportional to the speed of the conveyor which carries sheets from said intervening means to said deflector, means operatively connected with said inspecting means for recording on said first-named track the relative location of faulty sheets, an electronic circuit operatively connected with said tracks for storing a signal that a sheet is faulty while the sheet passes through said intervening means and thereafter feeding the signal to said second named track after the faulty sheet resumes its travel, and means operatively connected with said second-named track for operating said deflector on arrival of a faulty sheet.

5. In a line for shearing strip material into individual sheets, which line includes a shear, means for feeding strip to said shear, prime and reject sheet pilers, a series of conveyors for carrying sheets from said shear to said pilers, means for inspecting the strip for faults before it reaches said shear, a deflector between said conveyors and said pilers normally routing prime sheets to said prime piler, but operable to divert a faulty sheet to said reject piler, and intervening means between two conveyors of said series through which sheets pass and where their travel is interrupted, the combination therewith of an apparatus for controlling operation of said deflector comprising recording means for tracking movement of a faulty sheet from said shear to said intervening means, another recording means for tracking movement of a faulty sheet from said intervening means to said deflector, means operatively connected with each of said recording means for adjusting them in accordance with the sheet length to enable them to track the leading edges of sheets while receiving intelligence that the trailing edges have passed given points, and an electronic circuit operatively connected with the two recording means for storing a signal that a sheet is faulty while the sheet passes through said intervening means and thereafter feeding the signal to said second-named recording means.

6. In a line for shearing strip material into individual sheets, which line includes a shear, means for feeding strip to said shear, prime and reject sheet pilers, a series of conveyors for carrying sheets from said shear to said pilers, means for inspecting the strip for faults before it reaches said shear, a deflector between said conveyors and said pilers normally routing prime sheets to said prime piler, but operable to divert a faulty sheet to said reject piler, and intervening means between two conveyors of said series through which sheets pass and where their travel is interrupted, the combination therewith of an apparatus for controlling operation of said deflector comprising recording means for tracking movement of a faulty sheet from said shear to said intervening means, another recording means for tracking movement of a faulty sheet from said intervening means to said deflector, a sheet length computer operatively connected with each of said recording means for automatically adjusting them in accordance with the sheet length to record and track the movement of the leading edges of faulty sheets while receiving intelligence that the trailing edges thereof have passed given points, and an electronic circuit operatively connected with the two recording means for storing a signal that a sheet is faulty while the sheet passes through said intervening means and thereafter feeding the signal to said second-named recording means.

7. In a line for shearing strip material into individual sheets, which line includes a shear, a roller leveler for feeding strip to said shear, prime and reject sheet pilers, first and second conveyors in series for carrying sheets from said shear to said pilers, means for inspecting the strip for faults before it reaches said shear, a deflector between said second conveyor and said pilers normally routing prime sheets to said prime piler, but operable to divert a faulty sheet to said reject piler, and an intervening roller leveler between said first and second conveyors through which sheets pass and where their travel is interrupted, the combination therewith of an apparatus for controlling operation of said deflector comprising a recording track driven at a rate proportional to the speed of said first conveyor, another recording track driven at a rate proportional to the speed of said second conveyor, means operatively connected with said inspecting means for recording on said first-named track the relative location of a faulty sheet while carried by said first conveyor, an electronic circuit operatively connected with said tracks and actuated when a faulty sheet enters said intervening roller leveler for storing a signal that a sheet is faulty while passing therethrough, said circuit recording on said second-named track the relative location of a faulty sheet while carried by said second conveyor, and means operatively connected with said second-named track for operating said deflector on arrival of a faulty sheet.

8. In a line for shearing strip material into individual sheets, which line includes a shear, a roller leveler for feeding strip to said shear, prime and reject sheet pilers, first and second conveyors in series for carrying sheets from said shear to said pilers, means for inspecting the strip for faults before it reaches said shear, a deflector between said second conveyor and said pilers normally routing prime sheets to said prime piler, but operable to divert a faulty sheet to said reject piler, and an intervening roller leveler between said first and second conveyors through which sheets pass and where their travel is interrupted, the combination therewith of an apparatus for controlling operation of said deflector comprising a recording track driven at a rate proportional to the speed of said first conveyor, another recording track driven at a rate proportional to the speed of said second conveyor, respective recording heads positioned adjacent said tracks, a sheet length computer operatively connected with said heads for automatically positioning them in accordance with the sheet length, means actuated when the trailing edge of a faulty sheet passes a given point and operatively connected with the recording head adjacent said first-named track for recording thereon the relative location of the leading edge of a faulty sheet while carried by said first conveyor, an electronic circuit operatively connected with said first-named track and with the recording head adjacent said second-named track and actuated when the leading edge of a faulty sheet enters said intervening roller leveler for storing a signal that a sheet is faulty while passing therethrough, said circuit subsequently energizing the last-named recording head for recording on said second-named track the relative location of the leading and trailing edges of a faulty sheet while carried by said second conveyor, and means operatively connected with said second-named track for operating said deflector on arrival of a faulty sheet.

9. In a line for shearing strip material into individual sheets, which line includes a shear, a roller leveler for feeding strip to said shear, prime and reject sheet pilers, first and second conveyors in series for carrying sheets from said shear to said pilers, means for inspecting the strip for faults before it reaches said shear, a deflector between said second conveyor and said pilers normally routing prime sheets to said prime piler, but operable to divert a faulty sheet to said reject piler, and an intervening roller leveler between said first and second conveyors through which sheets pass and where their travel is interrupted, the combination therewith of an apparatus for controlling operation of said deflector comprising a recording track driven at a rate proportional to the strip speed, another recording track driven at a rate proportional to the speed of said first conveyor, another recording track driven at a rate proportional to the speed of said second conveyor, means operatively connected with said inspecting means for recording on said first-named track the location of faults in the strip, a transfer circuit operatively connected with said first-named track for storing a fault signal for an interval starting when the fault passes a given point and ending when the trailing edge of the sheet containing the fault passes the same point, means operatively connecting said transfer circuit and said second-named track for recording on the latter the location of faulty sheets while carried by said first conveyor, an electronic circuit operatively connected with said second-named and third-named tracks and actuated when a faulty sheet enters said intervening roller leveler for storing a signal that a sheet is faulty while passing therethrough, said last-named circuit recording on said third-named track the location of faulty sheets while carried by said second conveyor, and means operatively connected with said third-named track for operating said deflector on arrival of a faulty sheet.

10. In a sheet classifier which includes first and second conveyors in series for carrying sheets in a row, intervening means between said conveyors through which the sheets pass and where their travel is interrupted, recording means for tracking the travel of selected sheets on said first conveyor, and recording means for tracking the travel of the same selected sheets on said second conveyor, the combination therewith of an electronic circuit for transferring the track of a sheet from said first-named recording means to said second-named recording means, said circuit comprising means actuated when the leading edge of a sheet recorded on said first-named recording means enters said intervening means for storing a signal, means actuated when the trailing edge of a recorded sheet emerges from said intervening means for recording on said second-named recording means the relative location of the leading edge of the sheet, and means actuated when the trailing edge of a sheet following the recorded sheet emerges from said intervening means for recording on said second-named recording means the relative location of the trailing edge of the recorded sheet.

11. In a line for shearing strip material into individual sheets, which line includes a shear, means for feeding strip to said shear, prime and reject sheet pilers, a conveyor for carrying sheets from said shear to said pilers, means for inspecting the strip for faults before it reaches said shear, and a deflector between said conveyor and said pilers normally routing prime sheets to said prime piler, but operable to divert a faulty sheet to said reject piler, the combination therewith of an apparatus for controlling operation of said deflector comprising recording means for tracking movement of a faulty sheet as it travels from said shear toward said deflector, means operatively connected with said recording means for adjusting it in accordance with the sheet length to enable it to track the leading edges of sheets while receiving intelligence that the trailing edges have passed a given point, and means operatively connecting said recording means with said deflector for operating the latter on arrival of a faulty sheet.

12. In a line for shearing strip material into individual sheets, which line includes a shear, means for feeding strip to said shear, prime and reject sheet pilers, a conveyor for carrying sheets from said shear to said pilers, means for inspecting the strip for faults before it reaches said shear, and a deflector between said conveyor and said pilers normally routing prime sheets to said prime piler, but operable to divert a faulty sheet to said reject piler, the combination therewith of an apparatus for controlling operation of said deflector comprising recording means for tracking movement of a faulty sheet as it travels from said shear toward said deflector, a sheet length computer operatively connected with said recording means for automatically adjusting it in accordance with the sheet length, means responding when the trailing edge of a faulty sheet passes a given point for recording on the adjusted recording means the relative location of the leading edge of a faulty sheet, and means operatively connecting said recording means with said deflector for operating the latter on arrival of a faulty sheet.

13. In a line for shearing strip material into individual sheets, which line includes a shear, means for feeding strip to said shear, prime and reject sheet pilers, a conveyor for carrying sheets from said shear to said pilers, means for inspecting the strip for faults before it reaches said shear, and a deflector between said conveyor and said pilers normally routing prime sheets to said prime piler, but operable to divert a faulty sheet to said reject piler, the combination therewith of an apparatus for controlling operation of said deflector comprising a recording track driven at a rate proportional to the speed of said conveyor, a recording head positioned adjacent said track, a sheet length computer operatively connected with said head for automatically positioning it in accordance with the sheet length, means actuated when the trailing edge of a faulty sheet passes a given point and operatively connected with said recording head for recording on said track the relative location of the leading edge of a faulty sheet while carried by said conveyor, and means operatively connecting said track with said deflector for operating the latter on arrival of a faulty sheet.

14. In a sheet classifier which includes a conveyor adapted to carry sheets in a row, a recording track driven at a rate proportional to the conveyor speed, a cooperating recording head for recording on said track the relative location of selected sheets carried by said conveyor, and means actuated when the trailing edge of a sheet selected for recording passes a given point for energizing said head, the combination therewith of a positioning mechanism for said head comprising a computer for determining the sheet length, and motive means operatively connected with said computer for adjusting said head to a position which corresponds with the relative location of the leading edges of sheets carried by said conveyor, whereby a recording on said track represents the location of the leading edge of a sheet selected for recording while the intelligence for producing the recording originates when the trailing edge passes a given point.

15. A combination as defined in claim 14 in which said computer includes means for producing a signal of a magnitude proportional to the conveyor speed, and means for integrating said signal for an interval starting when the trailing edge of a sheet passes said point and ending when the trailing edge of the sheet following passes said point, thereby obtaining a signal proportional to the sheet length.

16. In a sheet classifier which includes a conveyor for carrying sheets in a row, a recording track driven at a rate proportional to the conveyor speed, a cooperating recording head for recording on said track the relative location of selected sheets carried by said conveyor, and means actuated when the trailing edge of a sheet selected for recording passes a given point for energizing said head, the combination therewith of a positioning mechanism for said head comprising means for producing a signal of a magnitude proportional to the instant position of said head, a sheet length computer for producing a signal proportional to the sheet length, means for comparing the two signals, and reversible motive means operatively connected with said comparing means for adjusting said head in response to a difference between the magnitude of said signals to a position which corresponds with the relative location of the leading edges of sheets carried by said conveyor, whereby a recording on said track represents the location of the leading edge of a sheet selected for recording while the intelligence for producing the recording originates when the trailing edge passes a given point.

17. A sheet classifying method comprising tracking the travel of a faulty sheet as it is carried on a first conveyor, electronically storing a signal of the faulty sheet when the sheet leaves the first conveyor and passes through an intervening means where its travel is interrupted, and tracking the travel of the faulty sheet as it is carried on a second conveyor after emerging from said intervening means.

18. A sheet classifying method comprising recording on a track the relative location of the leading edge of a faulty sheet from intelligence obtained when the trailing edge passes a given point, utilizing the recording to track the travel of the faulty sheet as it is carried on a first conveyor, electronically storing a signal of the faulty sheet when the sheet leaves the first conveyor and passes through an intervening means where its travel is interrupted, recording on another track the relative locations of both the leading and trailing edges of the faulty sheet from intelligence obtained when its trailing edge passes a given point after emerging from said intervening means, and utilizing the second recording to track the travel of the faulty sheet as it is carried on a second conveyor from said intervening means.

19. A sheet tracking method comprising computing the sheet length, adjusting a recording means in accordance with the computed length, obtaining intelligence of the trailing edges of selected sheets passing a given point, and recording on said means from said intelligence the relative location of the leading edges of sheets thus selected.

20. A method of tracking selected sheets from a row of sheets traveling in a line comprising computing the sheet length, adjusting a recording means in accordance with the computed length, obtaining intelligence of the trailing edges of sheets selected for recording passing a given point, energizing said recording means from said intelligence to record the relative location of the leading edges of sheets thus selected, and driving said recording means at a rate proportional to the sheet speed.

References Cited by the Examiner
UNITED STATES PATENTS

| | | | |
|---|---|---|---|
| 2,933,185 | 4/60 | Coleman | 209—111.5 XR |
| 2,950,640 | 8/60 | Camp | 209—111.5 XR |
| 2,971,414 | 2/61 | Owen | 209—111.5 XR |

MICHAEL V. BRINDISI, *Primary Examiner.*

CHARLES W. LANHAM, CLAUDE A. LE ROY,
*Examiners.*